United States Patent
Newcombe et al.

(10) Patent No.: US 7,290,040 B2
(45) Date of Patent: Oct. 30, 2007

(54) METHOD AND SYSTEM FOR LOAD BALANCING AN AUTHENTICATION SYSTEM

(75) Inventors: Christopher Richard Newcombe, Kirkland, WA (US); Paul David Jones, Renton, WA (US)

(73) Assignee: Valve Corporation, Bellevue, WA (US)

( * ) Notice: Subject to any disclaimer, the term of this patent is extended or adjusted under 35 U.S.C. 154(b) by 807 days.

(21) Appl. No.: 10/318,351

(22) Filed: Dec. 11, 2002

(65) Prior Publication Data

US 2003/0172290 A1 Sep. 11, 2003

Related U.S. Application Data

(60) Provisional application No. 60/341,079, filed on Dec. 12, 2001.

(51) Int. Cl.
G06F 15/173 (2006.01)

(52) U.S. Cl. ..................................................... 709/217

(58) Field of Classification Search ................. 709/105, 709/104, 223, 226
See application file for complete search history.

(56) References Cited

U.S. PATENT DOCUMENTS

| | | | |
|---|---|---|---|
| 4,310,720 A | | 1/1982 | Check, Jr. |
| 4,920,487 A | * | 4/1990 | Baffes ........................ 718/105 |
| 4,999,766 A | | 3/1991 | Peters et al. |
| 5,305,389 A | | 4/1994 | Palmer |
| 5,325,526 A | | 6/1994 | Cameron et al. |
| 5,343,526 A | | 8/1994 | Lassers |
| 5,349,643 A | | 9/1994 | Cox et al. |
| 5,495,533 A | | 2/1996 | Linehan et al. |
| 5,535,276 A | | 7/1996 | Ganesan |
| 5,606,693 A | * | 2/1997 | Nilsen et al. ................. 707/10 |
| 5,613,089 A | | 3/1997 | Hornbuckle |
| 5,619,716 A | | 4/1997 | Nonaka et al. |
| 5,634,107 A | * | 5/1997 | Yumoto et al. ............. 711/111 |
| 5,732,275 A | | 3/1998 | Kullick et al. |
| 5,737,495 A | | 4/1998 | Adams et al. |
| 5,742,829 A | | 4/1998 | Davis et al. |
| 5,757,919 A | | 5/1998 | Herbert et al. |
| 5,764,992 A | | 6/1998 | Kullick et al. |
| 5,808,690 A | * | 9/1998 | Rich .......................... 345/505 |
| 5,819,082 A | | 10/1998 | Marion |
| 5,829,001 A | | 10/1998 | Li et al. |
| 5,835,601 A | | 11/1998 | Shimbo et al. |

(Continued)

OTHER PUBLICATIONS

International Preliminary Examining Authority, Written Opinion for PCT/US02/39975 dated May 31, 2006, 6 pages.

(Continued)

*Primary Examiner*—David Y. Eng
(74) *Attorney, Agent, or Firm*—Darby & Darby PC; John W. Branch (57) ABSTRACT

A method and system are directed towards balancing loads on an authentication system. The system employs a first authentication server that is configured to authenticate a user. The system includes a master authentication server. When the master authentication server determines that a load on it has reached a pre-determined value, a data store associated with the master authentication server is partitioned between authentication servers that assume a master authentication server role for its partition of the data store. In one embodiment, each new master authentication server is further enabled to partition its respective partition of the data store, if their respective loads reach the pre-determined value.

23 Claims, 6 Drawing Sheets

U.S. PATENT DOCUMENTS

| | | | |
|---|---|---|---|
| 5,850,535 | A | 12/1998 | Maystrovsky et al. |
| 5,862,339 | A | 1/1999 | Bonnaure et al. |
| 5,915,112 | A | 6/1999 | Boutcher |
| 5,926,624 | A | 7/1999 | Katz et al. |
| 5,933,835 | A | 8/1999 | Adams et al. |
| 5,960,189 | A | 9/1999 | Stupek, Jr. et al. |
| 5,970,143 | A | 10/1999 | Schneier et al. |
| 5,982,893 | A | 11/1999 | Hughes |
| 5,999,740 | A | 12/1999 | Rowley |
| 6,009,528 | A | 12/1999 | Teraoka |
| 6,018,717 | A | 1/2000 | Lee et al. |
| 6,029,175 | A | 2/2000 | Chow et al. |
| 6,105,074 | A | 8/2000 | Yokote et al. |
| 6,119,203 | A | 9/2000 | Snyder et al. |
| 6,122,372 | A | 9/2000 | Hughes |
| 6,122,657 | A | 9/2000 | Hoffman, Jr. et al. |
| 6,154,767 | A | 11/2000 | Altschuler et al. |
| 6,195,622 | B1 | 2/2001 | Altschuler et al. |
| 6,223,166 | B1 | 4/2001 | Kay |
| 6,256,773 | B1 | 7/2001 | Bowman-Amuah |
| 6,269,400 | B1 | 7/2001 | Douglas et al. |
| 6,292,889 | B1 | 9/2001 | Fitzgerald et al. |
| 6,314,409 | B2 | 11/2001 | Schneck et al. |
| 6,317,786 | B1 | 11/2001 | Yamane et al. |
| 6,332,198 | B1 | 12/2001 | Simons et al. |
| 6,338,072 | B1 | 1/2002 | Durand et al. |
| 6,351,775 | B1 | 2/2002 | Yu |
| 6,366,947 | B1 | 4/2002 | Kavner |
| 6,381,742 | B2 | 4/2002 | Forbes et al. |
| 6,397,258 | B1 | 5/2002 | Tsuji et al. |
| 6,430,608 | B1 | 8/2002 | Shaio |
| 6,438,141 | B1 | 8/2002 | Hanko et al. |
| 6,453,353 | B1 | 9/2002 | Win et al. |
| 6,466,979 | B1 | 10/2002 | Plouffe, Jr. |
| 6,473,793 | B1 | 10/2002 | Dillon et al. |
| 6,487,455 | B1 | 11/2002 | Balasubramanian |
| 6,505,255 | B1 | 1/2003 | Akatsu et al. |
| 6,578,054 | B1 | 6/2003 | Hopmann et al. |
| 6,578,102 | B1 | 6/2003 | Batchelor et al. |
| 6,584,568 | B1 | 6/2003 | Dircks et al. |
| 6,611,812 | B2 | 8/2003 | Hurtado et al. |
| 6,618,810 | B1 | 9/2003 | Dirie |
| 6,675,382 | B1 | 1/2004 | Foster |
| 6,678,700 | B1 | 1/2004 | Moore et al. |
| 6,684,396 | B1 | 1/2004 | Brittain et al. |
| 6,694,450 | B1 | 2/2004 | Kidder et al. |
| 6,711,593 | B1 | 3/2004 | Gordon et al. |
| 6,718,549 | B1 | 4/2004 | Narin et al. |
| 6,721,786 | B1 | 4/2004 | Gordon et al. |
| 6,735,601 | B1 | 5/2004 | Subrahmanyam |
| 6,738,970 | B1 | 5/2004 | Kruger et al. |
| 6,748,470 | B2 | 6/2004 | Goldick |
| 6,751,608 | B1 | 6/2004 | Cohen et al. |
| 6,752,313 | B1 | 6/2004 | Caviles et al. |
| 6,754,821 | B1 | 6/2004 | Berson et al. |
| 6,766,428 | B2 | 7/2004 | Saulsbury et al. |
| 6,771,290 | B1 | 8/2004 | Hoyle |
| 6,799,276 | B1 | 9/2004 | Belissent |
| 6,807,542 | B2 | 10/2004 | Bantz et al. |
| 6,829,649 | B1 | 12/2004 | Shorey et al. |
| 6,848,028 | B1 | 1/2005 | Sugumar et al. |
| 6,862,616 | B1 | 3/2005 | Tompkins |
| 6,868,539 | B1 | 3/2005 | Travison et al. |
| 6,871,344 | B2 | 3/2005 | Grier et al. |
| 6,871,345 | B1 | 3/2005 | Crow et al. |
| 6,880,086 | B2 | 4/2005 | Kidder et al. |
| 6,883,168 | B1 | 4/2005 | James et al. |
| 6,912,520 | B2 | 6/2005 | Hankin et al. |
| 6,938,005 | B2 | 8/2005 | Iverson et al. |
| 6,950,523 | B1 | 9/2005 | Brickell et al. |
| 6,961,341 | B1 | 11/2005 | Krishnan |
| 6,986,133 | B2 | 1/2006 | O'Brien et al. |
| 6,996,599 | B1 | 2/2006 | Anders et al. |
| 7,000,230 | B1 | 2/2006 | Murray et al. |
| 7,035,943 | B2 | 4/2006 | Yamane et al. |
| 7,131,111 | B2 | 10/2006 | Passanisi |
| 7,143,143 | B1 | 11/2006 | Thompson |
| 2002/0035526 | A1 | 3/2002 | Kutaragi et al. |
| 2002/0059408 | A1 | 5/2002 | Pattabhiraman et al. |
| 2002/0075844 | A1 | 6/2002 | Hagen |
| 2002/0150253 | A1 | 10/2002 | Brezak et al. |
| 2002/0166117 | A1 | 11/2002 | Abrams et al. |
| 2002/0172222 | A1 | 11/2002 | Ullmann et al. |
| 2003/0009365 | A1 | 1/2003 | Tynan et al. |
| 2003/0039211 | A1 | 2/2003 | Hvostov et al. |

OTHER PUBLICATIONS

Microsoft Corporation, Microsoft Windows 2000 Server Operating System, "Windows 2000 Kerberos Authentication," White Paper, 46 pages (1999).

Rajiv Jauhari et al., "Priority-Hints: An Algorithm for Priority-Based Buffer Management," Proceedings of the 16th VLDB Conference, Brisbane, Australia, 1990, pp. 708-721.

* cited by examiner

METHOD AND SYSTEM FOR LOAD BALANCING AN AUTHENTICATION SYSTEM

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. § 119(e).

FIELD OF THE INVENTION

The present invention relates generally to computers, and more particularly to load balancing of an authentication system.

BACKGROUND OF THE INVENTION

Today, software may be distributed over the Internet. If the software can be packaged in a small executable, a software vendor may choose to distribute the software over the Internet.

Once the software is downloaded, the user may share the downloaded software with a friend. Some Internet sites attempt to limit sharing of the software by requiring a user to be authenticated in some manner prior to obtaining access to the software. In some authentication systems, the user may need to be authenticated more than once to access the software. As the popularity of the software increases, however, so does the number of users seeking authentication.

These increased authentications may burden the authentication system. As the load on the authentication system increases, throughput tends to decrease, resulting in decreased enjoyment of the software access process by the user. This may in turn result in decreased purchases of the software. Therefore, there is a need in the industry for reducing load of an authentication system. Thus, it is with respect to these considerations and others that the present invention has been made.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

A method and system are directed towards balancing loads on an authentication system. In one aspect of the present invention, the system includes a data store, and a master authentication server. The data store is configured to store data about a user. The master authentication server is coupled to the data store, and is configured to authenticate the user. If a load on the master authentication server exceeds a pre-determined value, the master authentication server enables another authentication server to authenticate the user.

In another aspect of the present invention, the method is directed to load balancing an authentication system. The method includes determining a load associated with a master authentication server. If the load exceeds a pre-determined criteria, the method suspends transactions to the master authentication server; partitions a data store associated with the master authentication server, and allocates the partitions between authentication servers for authentication of the user, wherein the authentication servers assume a master role for their respective partitions.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Briefly stated, the present invention is directed to a method and system for enabling load balancing of an authentication system. The system employs a master authentication server that is configured to authenticate a user. In one embodiment, the master authentication server is enabled to monitor a load it is under, as determined by a variety of metrics, including CPU utilization, disk subsystem utilization, amount of memory used, number of thread context switches per second, number of memory page-faults per second, and the like. In another embodiment, a different component within the system, such as a client, another server, or the like, monitors the load on the master authentication server. When the load has reached a pre-determined value, momentary or sustained, the monitoring system triggers a partition of a data store between the authentication servers. Each authentication server assumes a master authentication role for its partition of the data store. In one embodiment, the other authentication server are again be partitioned when their respective load reach the pre-determined value. In this manner, the present invention enables additional authentication servers to assume the master authentication role for yet another partition of the data store, thereby further reducing the load on any single authentication server.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++, an open-source class library of cryptographic techniques, the source code of which is hereby incorporated by reference, may be used in encrypting or decrypting applications and/or data. Other encryption and decryption libraries, both open source, commercial, and/or proprietary may be used without departing from the spirit or scope of the invention.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for Secure Hash Algorithm 1. SHA1 is a cryptographic hash algorithm that produces a 160-bit hash value from an arbitrary length string. In other embodiments of the invention, other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in the Bible. A RSA signature may be created and/or formatted as described in RSA's PKCS #1, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is CryptoAPI, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

Illustrative Application Authentication System

Figure 1:
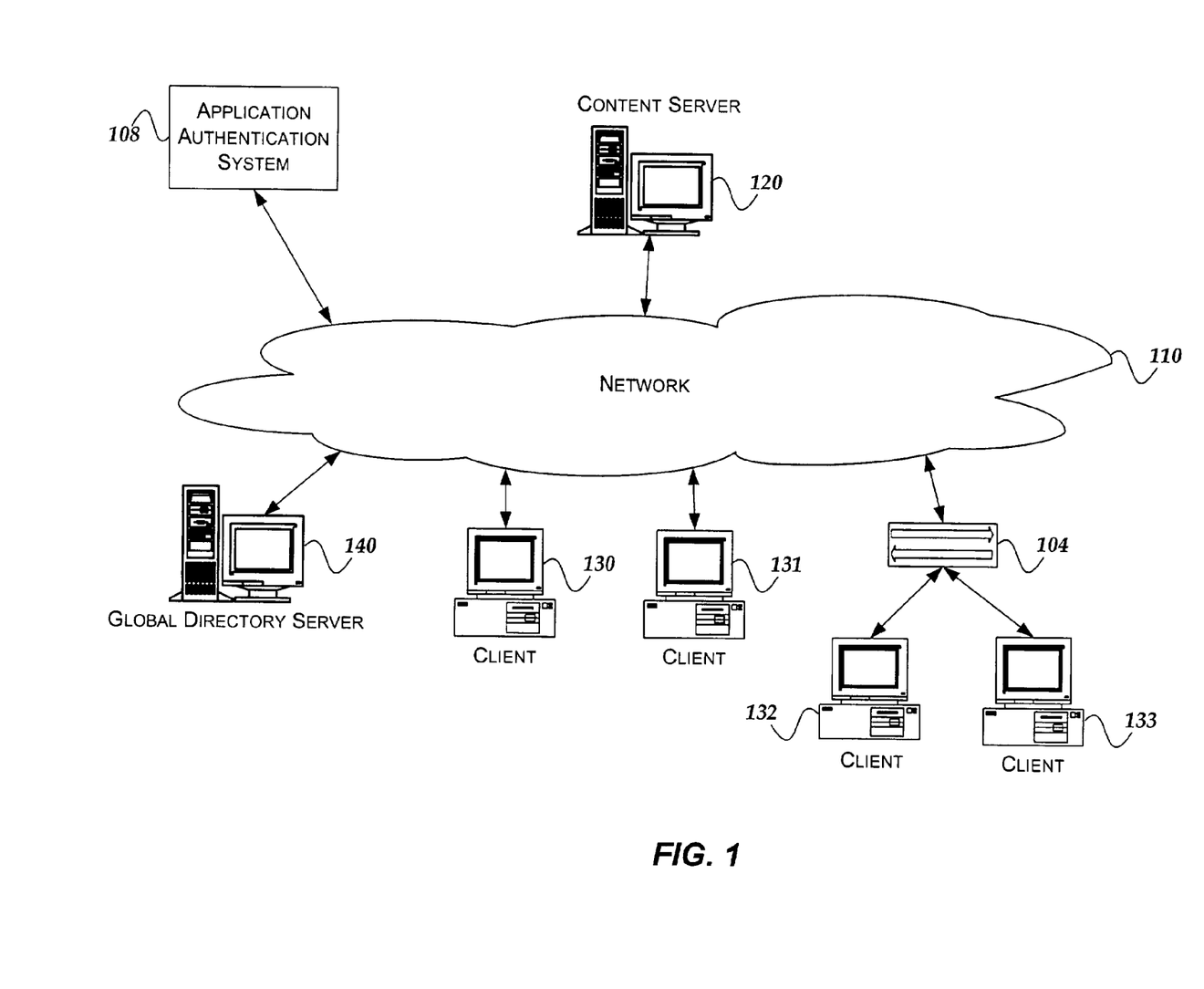
FIG. 1 illustrates a block diagram generally showing an overview of one embodiment in which the invention may be practiced.
Figure 4:
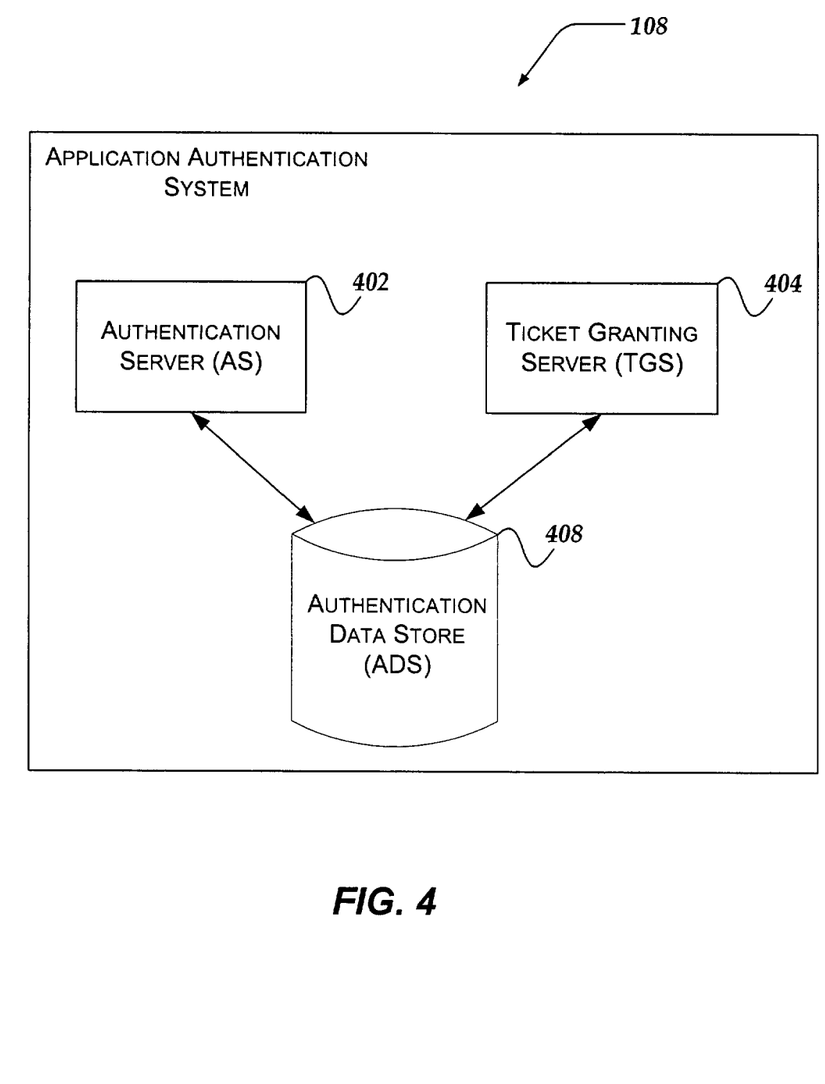
FIG. 4 illustrates a functional block diagram of one embodiment of components of an application authentication system as shown in FIG. 1.

FIG. 4 illustrates a functional block diagram of one embodiment of components of Application Authentication System (AAS) 108 as shown in FIG. 1. AAS 108 may include many more components than those shown in FIG. 4. However, the components shown are sufficient to disclose an illustrative embodiment for practicing the present invention. Moreover, the components shown in FIG. 4 may be distributed across a network, multiple servers, clients, and the like. The components may also be within a single server, client, or the like, without departing from the scope or spirit of the present invention.

AAS 108 includes authentication server (AS) 402, ticket-granting server (TGS) 404, and Authentication Data Store (ADS) 408. As shown in the figure, ADS 408 is in communication with AS 402 and TGS 404.

ADS 408 is configured to provide storage for information associated with a client, user, ticket, and the like. ADS 408 may also store information about whether a user is currently logged into a content server, AAS 108, and the like. ADS 408 may include a database, a flat file, a directory structure, and the like. In one embodiment, ADS 408 includes password information associated with the user. In another embodiment, the password is stored in a hashed format, employing any of a variety of hashing mechanisms described above. ADS 408 may also be configured to store a pseudo-random sequence of bits, known as a salt. In one embodiment, the salt is 64-bits in length.

AS 402 is configured to operate with TGS 404 to enable a user to obtain access to a content server. AS 402 is enabled to authenticate a user employing an authentication mechanism that has some features similar to the Kerberos model, which is hereby incorporated by reference. For example, AS 402 is configured to receive a request for access to a server from the client. The request includes a timestamp, known as a pre-authenticator that is modified with the user's password (e.g. encrypted using the client's hashed salted password as a key). However, unlike Kerberos, the present invention also modifies the timestamp with a digest of the client's local and remote IP addresses before encryption. AS 402 employs the client's hashed salted password information received from ADS 408, to decrypt the request and authenticate the user.

In one embodiment, AS 402 extracts the timestamp from the modified pre-authenticator and pre authenticates the client based at least in part on the timestamp being within an acceptable time window.

AS 402 is further configured to examine the client's IP addresses to determine whether other users are attempting to share the user's account. The client may obtain its IP addresses through a variety of mechanisms including a system call, a prior communication with AS 402, or the like. By requiring the client to provide its IP addresses, the present invention may also minimize the effects of a network address translation described above.

Salting the password is directed toward making an attack, such as a dictionary attack, or the like, on the client's stored password more difficult. Salting of the user's password may be achieved by appending a salt obtain from ADS 408 to the user's plaintext password. The salted password is then hashed, employing any of a variety of hashing mechanisms, including those described above. The hashed salted password may be provided to AS 402 by the client through a prior encrypted session that employed a public/private encryption key pair associated with AS 402. In one embodiment, the prior session is a create user account session. In another embodiment, to ensure authenticity of the public/private encryption key pair associated with AS 402, and to minimize tampering, the public/private encryption key pair is digitally signed by a private encryption key. In that embodiment, the client may obtain the corresponding public encryption key through any of a variety of out-of-band mechanisms, including through a prior purchase of software.

If AS 402 determines that the user is a valid user, AS 402 is further configured to provide the client with a ticket granting ticket (TGT). The TGT typically includes a server readable portion, a client readable portion, and the timestamp that is now called an authenticator. The client readable portion may include a session key, a lifetime parameter, and the like. The lifetime parameter may include information associated with a time after which the ticket is valid, an expiration time for the ticket, and the like. In one embodiment, the session key is signed and encrypted with the private encryption key of AS 402. The client readable portion may be encrypted with the user's hashed salted password.

The server readable portion may include the lifetime parameter, session key, user name, an account name associated with the user, and the like. In one embodiment, the server readable portion is signed with a public encryption key associated with the AS 402. Moreover, the server readable portion may also be encrypted by a public encryption key associated with TGS 404. The public encryption keys employed may include any of a variety of public/private encryption key mechanisms including those described above.

In one embodiment, a modified authenticator is provided in addition to the server readable portion. The modified authenticator includes information associated with the client's local IP address, remote IP address, and timestamp. In one embodiment, the client's local and remote IP addresses are concatenated, and hashed, employing any of the hashing mechanisms described above, to provide a hashed digest. The hashed digest is exclusive or'ed (xor'ed) with the timestamp. In one embodiment, the modified authenticator is encrypted with the session key to ensure that the user was able to obtain the session key by decrypting the client readable portion it previously received. Because, the client readable portion is encrypted with the user's hashed salted password, this indirectly ensures that the user knows their own password (i.e., is authenticate).

AS 402 may also be configured to determine whether another client is attempting to employ an account of a user that is currently logged into a content server, or the like. This may arise for example, when a user shares passwords, account information, or the like, or when a user's information has been stolen, or the like. When AS 402 determines that the same user appears to be attempting multiple virtually simultaneous logins, AS 402 may cancel currently authorized tickets issued to that user. The AS 402 may use data in ADS 408 to determine what other tickets were granted to the client. It may then contact each content server for which a content ticket was granted and inform the content server that the content ticket is no longer valid.

The AS 402 may also contact one or more content servers and instruct them to take other actions with respect to a client that attempts to access content with a revoked ticket. For example, the AS 402 may instruct a content server that the client should display a message informing the user that another user is attempting to use tickets the user was previously given, that repeated attempts to obtain or use tickets in this manner may result in suspension of the user's account, and/or other appropriate information. AS 402 may employ other servers, including a CSDS 406, a Message server, a set of content servers, and/or any other server to propagate a message that a certain client and/or tickets should be denied access.

Additionally, AS 402 may provide location information to GDS 140 in FIG. 1, to enable clients, servers, and the like to locate AS 402. Location information may include a Universal Resource Locator (URL), a Media Access Control (MAC) address, and the like.

TGS 404 is configured to receive the server readable portion of the TGT and modified authenticator from the user, and to provide a valid user with a content ticket that enables access to an identified content server. TGS 404 is further configured to examine information in the server readable portion of the TGT to authenticate the client. In one embodiment, the TGS 404 is configured to decrypt the readable portion employing its private encryption key. Moreover, TGS 404 may employ the session key to decrypt the modified authenticator. TGS 404 may then extract the client's timestamp from the modified authenticator by employing the client's local and remote IP addresses. In one embodiment, TGS 404 examines the timestamp to determine if the client is valid.

TGS 404 may also be configured to obtain a second remote IP address associated with a TCP/IP packet header from the client that includes the TGT and the modified authenticator. The second remote IP addresses may also be obtained by a variety of mechanisms, including a system call, or the like. In another embodiment, the client also includes a second local IP address with the packet. TGS 404 is then configured to compare the IP addresses extracted from the TGT to the second IP addresses obtained by another mechanism to further validate the client.

Moreover, TGS 404 is configured to examine other parameters to validate the client, including the lifetime parameter, session key, user name, account name associated with the user, and the like If TGS 404 determines that the client is valid and authorized, TGS 404 is further configured to provide the client with the content ticket. In one embodiment, TGS 404 provides several content tickets, each of which is associated with a different content server. TGS 404 may determine which content server to provide the content tickets based in part on information received from a content server directory server (not shown). Moreover, the content ticket may include a server readable portion that is signed by a public encryption key associated with TGS 404. Additionally, the server readable portion is encrypted with a public encryption key associated with the receiving content server.

As the number of users to be authenticated increases, however, a load on AAS 108 may increase such that the authentication of a user slows, or even ceases. Therefore, the present invention is directed towards overcoming the affects of the load on AAS 108 by partitioning the load across AAS systems.

Figure 5:
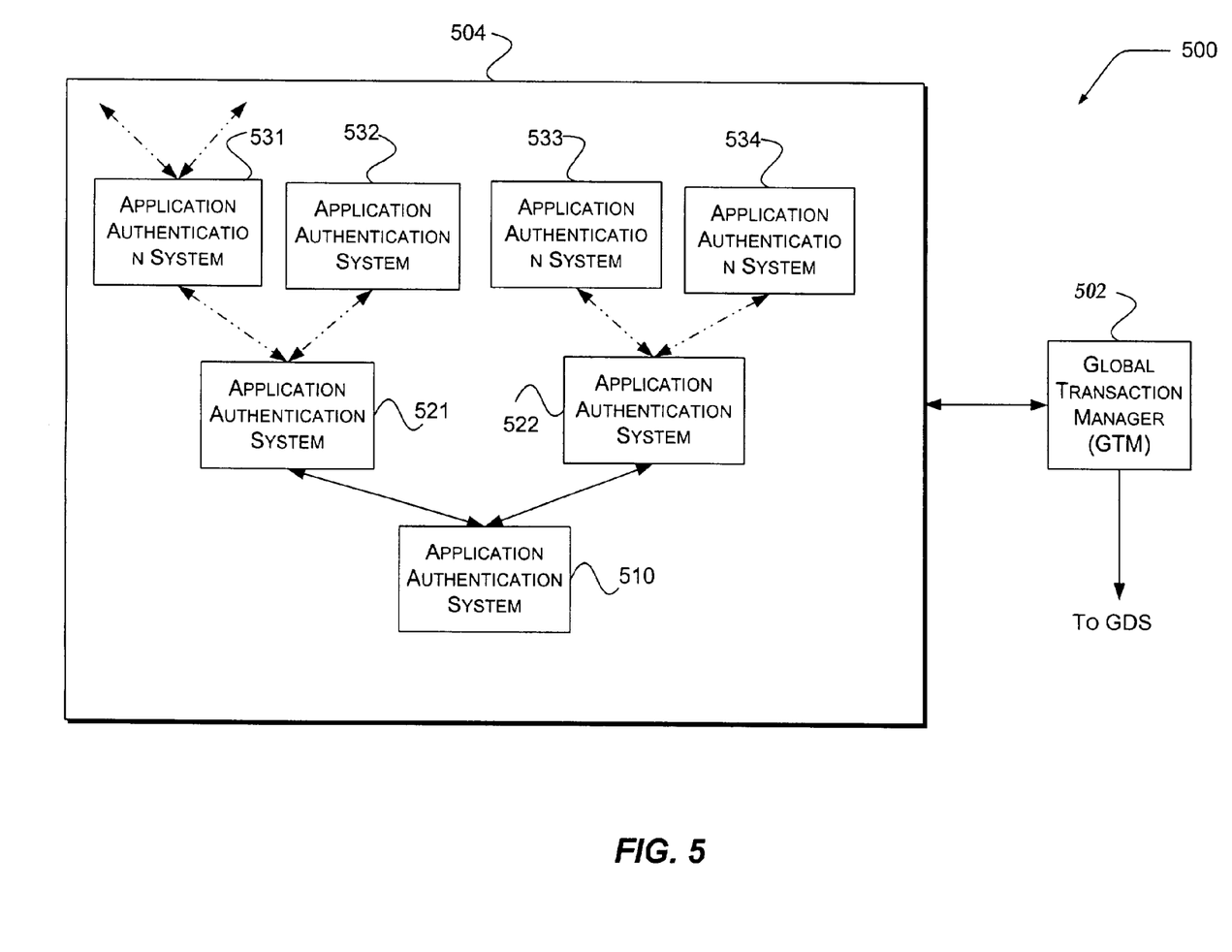
FIG. 5 a functional block diagram of one embodiment of a partitioning of the application authentication system shown in FIG. 1.

FIG. 5 illustrates a functional block diagram of one embodiment of a partitioning of the application authentication system shown in FIG. 1. As shown in the figure, partitioning system 500 includes partition 504 that is coupled to Global Transaction Manager (GTM) 502. Partition 504 includes AAS 510, and slave AASs 521-522 and 531-534. AAS 510, AASs 521-522, and 531-534 are substantially similar to AAS 108 described above in conjunction with FIG. 4. However, AAS 510 is configured to operate as a master system in partition 504. AASs 521-522 and 531-534 are slave systems in partition 504.

AAS 510 initially manages the authentication requests to system 100 in FIG. 1 as the master authentication system. As AAS 510 manages the authentication requests as described above, AASs 521-522 may replicate the Authentication DataStore included in AAS 510. While AASs 521-522 may operate as replicas or slaves to AAS 510, AASs 531-534 are typically off-line, as illustrated by the dashed lines in FIG. 5. As such, AASs 531-535 typically do not come on line until the AAS it is associated with (ASS 521-522) assumes a role as a master application authentication server.

AAS 510 evaluates a load on itself by monitoring a variety of load balancing metrics, including packet rates to an AAS within partition 504, CPU utilizations within AAS 510, and number of connections serviced by AAS 510. In addition, information about packets between components with AAS 510 may be used for load balancing. Such information includes round trip time, packet loss, and hops. Moreover, AAS 510 may also monitor overall network traffic, capacity of its data store, content requested, and the like.

GTM 502 enables AAS 510 to suspend authentications of users when it is determined that the load on the AAS 510 exceeds a pre-determined value, condition, test, or the like. GTM 502 may also enable the authentication data store within AAS 510 to be partitioned across AAS 521 and AAS 522, by coordinating a standard 2-phase commit distributed transaction, or the like. During partitioning, GTM 502 may also hold the state of distributed transitions to enable a single authoritative decision should a failure arise.

Partitioning of the authentication data store may be based on a variety of criteria including, including, client location, user name, frequency of requests by user, size of AAS's data stores, CPU capability or other characteristics of a AAS, and the like.

Figure 2:
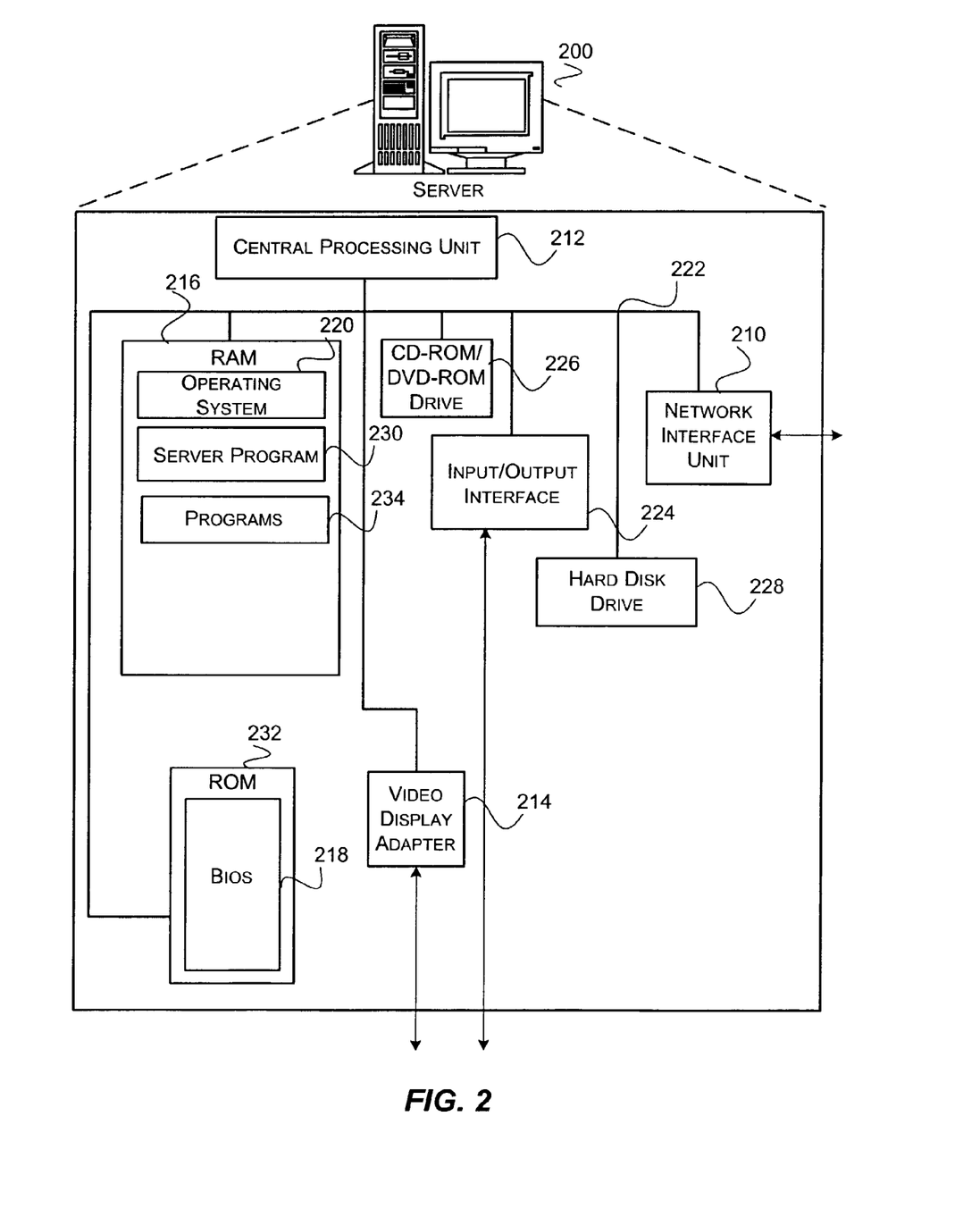
FIG. 2 illustrates a functional block diagram of one embodiment of a server as shown in FIG. 1.
Figure 3:
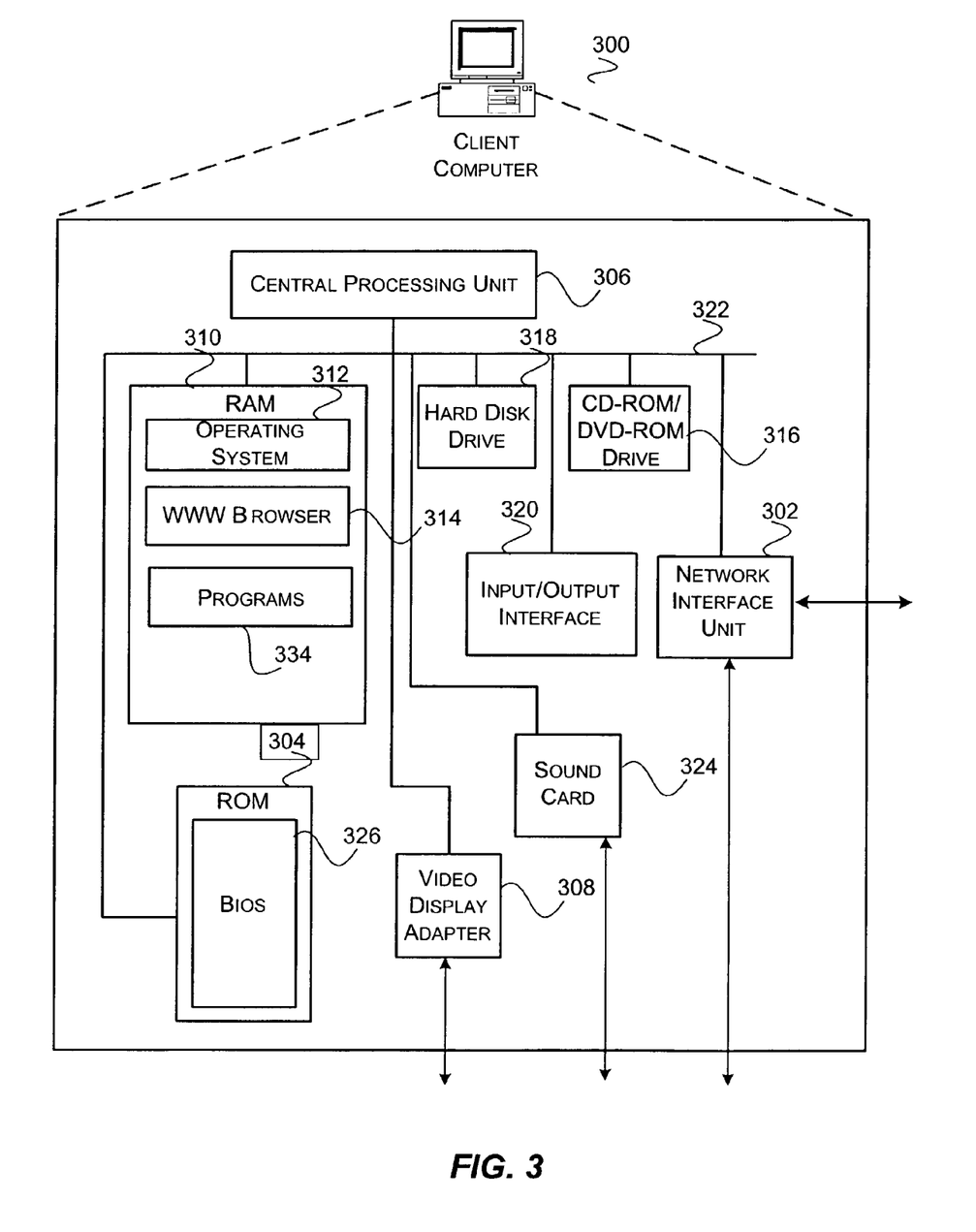
FIG. 3 illustrates a functional block diagram of one embodiment of a client as shown in FIG. 1.

Some devices that may be used as GTM 502 include a client such as client 300 in FIG. 3 and a server such as server 200 in FIG. 2.

Upon assuming a master role for its respective partition of AAS 510's data store, AAS 521-522 are configured to provide location information to GDS 140 in FIG. 1 to enable clients to locate and employ AAS 521-522 for authentication. AAS 510 may also inform GDS 140 that it is no longer accepting authentication requests as a master.

Additionally, as each AAS (521-522) also monitors their respective loads. Should the loads on either of the AASs exceed the pre-determined value, test, condition, or the like, the overloaded AAS triggers a partitioning of its respective authentication data store essentially as described above to enable AASs 531-534 to assume a partition of the load from the overloaded AAS (521-522).

Although, only seven AASs are illustrated in FIG. 5, additional AASs may be added to partition 504. For example, each AAS may be configured to inform a system administrator or the like, to place on-line yet another tier of AASs, as a lower tiered AAS assumes the master role. In this manner, the present invention enables a single master AAS replication scheme that is directed to being scalable and highly available. Moreover, additional slave AASs added to partition 504 address the partitioning of the particular overloaded AAS.

Generalized Operation

Figure 6:
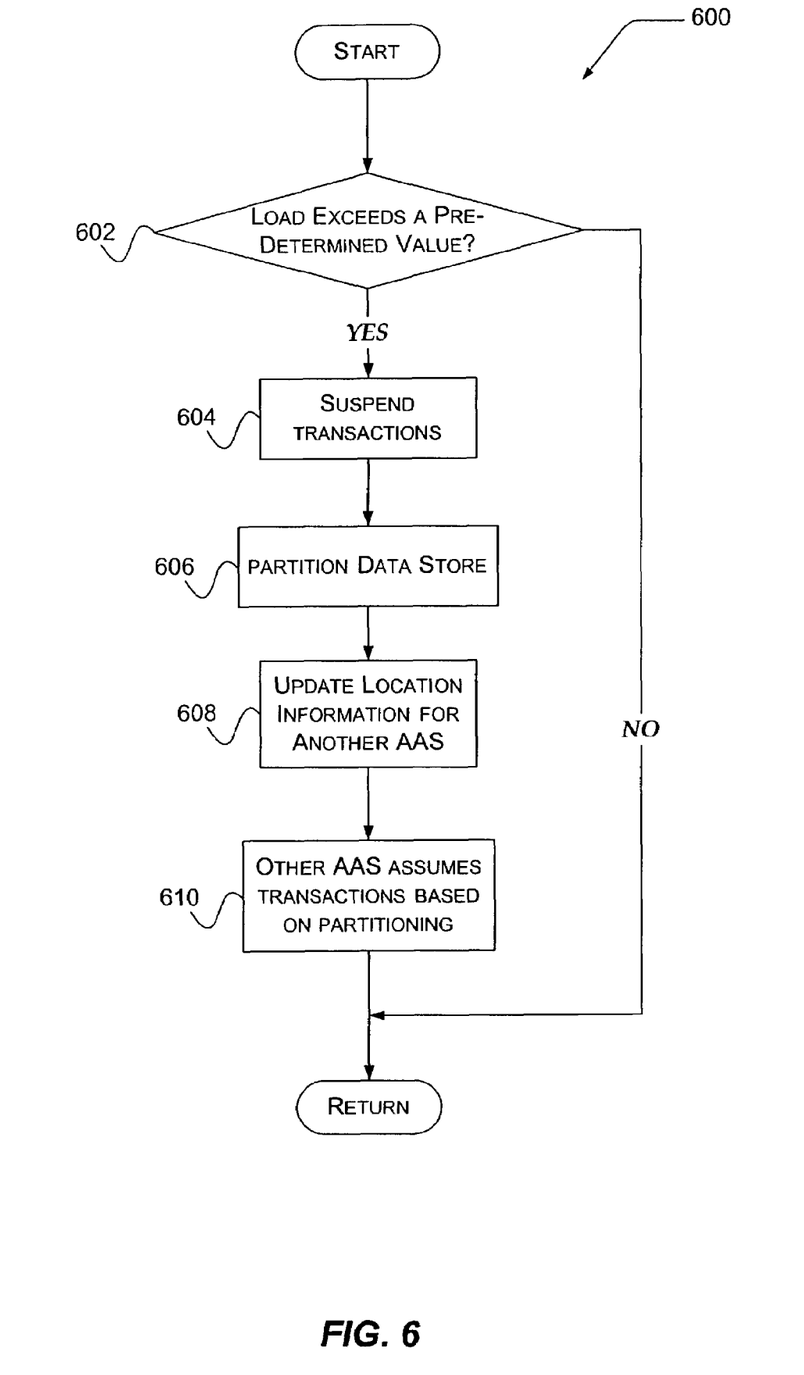
FIG. 6 illustrates a flow diagram generally showing one embodiment of a process for load balancing the application authentication system, in accordance with aspects of the invention.

The operation of certain aspects of the present invention will now be described with respect to FIG. 6, in accordance with the present invention.

Process 600 begins, after a start block, at decision block 602, where a determination is made whether the load on an Application Authentication System (AAS) exceeds a pre-determined value. The pre-determined value may be based on a set of criteria, including results of load balancing metrics, packet rates to the AAS, CPU utilizations of the AAS, and a number of connections serviced by the AAS. In addition, information about packets between components within the AAS may be used for load balancing. Such information may include round trip time, packet loss, and hops. Moreover, the pre-determined value may also be based on information obtained by monitoring overall network traffic, CPU utilization, disk subsystem utilization, amount of memory used, number of thread context switches per second, number of memory page-faults per second, capacity of the authentication data store, content requested, number of tickets requested, number of authentication requests in a wait queue, and the like. If it is determined that the load does not exceed the pre-determined value, process 600 returns to perform other processing. However, if it is determined that the load does exceed the pre-determined value processing proceeds to block 604.

At block 604, currently active authentication and ticketing transactions to and from the AAS are placed into a suspend queue. Suspending the currently active transactions enables the AAS to lock its data stores in preparation for partitioning. It also minimizes the likelihood that a transaction is dropped. Suspending and locking of transactions, and data stores, respectively, may be achieved employing any of a number of mechanisms known in the industry, or later derived. Processing continues to block 606.

At block 606, the data store is partitioned. In one embodiment, the data store is partitioned into two partitions that are allocated to at least two other AASs. Partitioning of the data store may be determined by a variety of criteria, including, including, client location, user name, frequency of requests by user, size of AAS's data stores, CPU capability or other characteristics of the AAS, and the like. Partitioning may further include partitioning of the suspended transactions based on substantially similar criteria.

Processing proceeds to block 608, where location information about the other AAS(s) is made available for clients, servers, and the like. In one embodiment, the location information includes an IP address of the AAS. Location information may be made available through a center broadcast message to known clients, servers, and the like. Moreover, location information may also include a Universal Resource Locator (URL), a Media Access Control (MAC) address, and the like. Location information may also be made available by providing it to a known server, such as GDS 140 shown in FIG. 1.

Process 600 continues to block 610, where the other AASs assumes the role of the master for its partitioned data store, transactions, and the like. In one embodiment, the first master AAS is taken off-line as the other AASs assume the role of master for their respective partition of the data store. As such, each AAS now operates substantially similar to the first AAS. Loads on each of the new AASs are monitored by process 600 in a substantially similar approach as described above. In this manner, the present invention enables additional AASs to assume the role of a master for a yet another partition of the data store in a recursive approach, thereby further reducing the load on any one AAS.

Illustrative Environment

FIG. 1 illustrates a block diagram generally showing an overview of one embodiment in which the present invention may be practiced. As shown in the figure, system 100 includes clients 130-133, Network Address Translation (NAT) server 104, content server 120, Application Authentication System (AAS) 108, Global Directory Server (GDS) 140, and network 110. System 100 may include many more components than those shown in FIG. 1. However, the components shown are sufficient to disclose an illustrative embodiment for practicing the present invention.

As further shown in the figure, NAT server 104 is in communication with clients 132-33, and network 110. Clients 130-131, content server 120, AAS 108, and GDS 140 each are in communication with network 110.

Network 110 can employ any form of computer readable media for communicating information from one electronic device to another. Network 110 can include local area networks (LANs), wide area networks (WANs), direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other known links. Furthermore, remote computers and other related electronic devices can be remotely connected to either LANs or WANs via a modem and temporary telephone link. In FIG. 1, it will be appreciated that the network 110 may comprise a vast number of interconnected networks, computers, and routers and therefore only a representative "cloud" is shown.

The media used to transmit information in the links illustrates one type of computer-readable media, namely communication media. Generally, computer-readable media includes any media that can be accessed by a computing device. Communication media typical embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

NAT 104 provides IP address translations allowing a single device, such as a router, to act as an agent between the Internet (network 110) and a local network (not shown), enabling a single, unique IP address to represent the enterprise. When a NAT enabled device is employed, the IP address space is typically partitioned into two parts—a reusable set of IP addresses internal to stub domains, and a set of globally unique IP addresses. The reusable IP addresses are typically called internal local IP addresses, or local addresses. The global IP addresses are termed global addresses, external address, or remote addresses. A given address is either a local address or a remote address.

NAT 104 may include a table comprising of pairs of local addresses and remote addresses. The IP addresses inside the stub domain, the local addresses, typically are not globally unique. Therefore, they may be reused in other domains. As the remote IP addresses are used to communicate to the Internet, these addresses typically are globally registered.

AAS 108 is shown in more detail in conjunction with FIG. 4. Briefly, however, AAS 108 is configured to authenticate a user, and to provide the authenticated user one or more content tickets that enables the authenticated user to access one or more content servers (120). AAS 108 may or may not be located in a single physical location. Components of the system may be distributed and connect to network 110 at different points.

Content server 120 may include virtually any electronic device capable of storing content and sending the content to a requesting device. Some devices that may be used as content server 120 include a client such as client 300 of FIG. 3 and a server such as server 200 of FIG. 2.

Content managed by content server 120 includes data, applications, licensing information, and the like. Content may be compressed, encrypted, or unencrypted. Content may be sent to requesters in a compressed, encrypted, or unencrypted format. Moreover, content may be packaged into blocks of data. Associated with the blocks may also be a checksum block. The checksum block provides integrity information associated with the blocks of data. The checksum block may also be in a compressed, encrypted, or unencrypted format.

Content server 120 may authenticate clients 130-133 that send a content ticket that was granted by AAS 108. The content ticket, which is described in more detail below, may include a client readable portion and a server readable portion. The portions may be encrypted such that only entities that have the correct encryption/decryption keys can read each portion.

Content server 120 is also configured to read its portion of the content ticket to verify whether the sending client should be enabled access to the requested content. In one embodiment of the invention, the client's local and remote IP addresses are included in the content ticket. As part of its authentication, content server 120 may validate that a request is coming from both a certain internal IP address and a certain remote IP address identified in the content ticket.

Content server 120 is further configured to invalidate content tickets. For example, when a user logs onto a new client, content tickets that are associated with a prior client may be invalidated to prevent simultaneous use, and the like.

GDS 140 is configured to provide location information about AAS 108 to clients 130-133, and content server 120. GDS 140 may receive the location information from AAS 108. In one embodiment, the location information includes an IP address.

Clients 130-133 are described in more detail with reference to FIG. 3 below. Briefly, however, clients 130-133 may include virtually any device capable of sending information to or receiving information from network 110. Clients 130-133 include personal computers, multiprocessor systems, microprocessor-based or programmable consumer electronics, network PCs, minicomputers, mainframe computers, and the like. As shown in FIG. 1, clients 132-133 reside behind NAT 104 such that the local IP addresses assigned to each client may be hidden from the other devices on network 110, such AAS 108. Moreover, clients 130-133 may be assigned its local IP addresses through various mechanisms, including static assignments, dynamic assignments such as Dynamic Host Configuration Protocol (DHCP), and the like.

Clients 130-133 are enabled to request access to servers, such as content server 120 by requesting content tickets from AAS 108. In one embodiment of the invention, clients 130-133 are enabled to provide information associated with local and remote IP addresses to AAS 108 as part of the request for content tickets. Clients 130-133 may also provide information associated with local and remote IP addresses to content server 120.

FIG. 2 illustrates a functional block diagram of one embodiment of a server, such as NAT 104, and content server 120, or the like, as shown in FIG. 1. Server 200 may include many more components than those shown in FIG. 2. However, the components shown are sufficient to disclose an illustrative embodiment for practicing the present invention.

As shown in figure, server 200 may be connected to network 110, or other communications network, via network interface unit 210. Network interface unit 210 includes the necessary circuitry for connecting server 200 to network 110, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, applications, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site, application server site, authentication site, or the like. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by application servers, content servers, and the like. For example, customer databases, product databases, image databases, and relational databases may be stored.

FIG. 3 illustrates a functional block diagram of one embodiment of a client computer as shown in FIG. 1. Client computer 300 may include many more components than those shown in FIG. 3. However, the components shown are sufficient to disclose an illustrative embodiment for practicing the present invention.

As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP")

connection or a serial line Internet protocol ("SLIP") connection as known to those skilled in the art.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300, and enabling a user to request access to a server, to execute applications, and the like. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A system for load balancing over a network, comprising:
 a data store that is configured to store data about each user; and
 a master authentication server that is configured to manage the data about each user, and if a load on the master authentication server exceeds a pre-determined value, performing actions, including:
  enabling the partitioning of the data store into a plurality of partitions in relation to the load, wherein the data about each user is stored in the plurality of partitions of the data store;
  allocating each partition to another each one of other master authentication servers; and
  enabling each other master authentication server to manage the data for each user on its partition, wherein enabling the each other master authentication server to manage comprises enabling the each other master authentication server to authenticate at least one user based on the data in its partition.

2. The system of claim 1, wherein the pre-determined value further comprises a set of criteria, including at least one of a packet rate, CPU utilization, disk subsystem utilization, amount of memory used, number of thread context switches per second, number of memory page-faults per second, CPU capacity, number of connections, a round trip time of a packet, packet loss, number of hops for a packet, network traffic, capacity of the data store, content requested, and a number of authentication requests.

3. The system of claim 1, wherein each other master authentication server is configured to perform further actions, including redirecting each user to the master authentication server that manages the data about that user on its partition.

4. The system of claim 3, wherein redirecting each user to the master authentication server further comprises employing a location indicator that includes at least one of an Internet Protocol (IP) address, a Universal Resource Locator (URL), and a Media Access Control (MAC) address.

5. The system of claim 1, wherein enabling the partitioning of the data further comprises suspending a transaction about each user in the data store.

6. The system of claim 1, wherein enabling the partitioning of the data further comprises employing a partitioning criteria that is based on at least one of a client location, user name, frequency of requests by each user, characteristic of the data store, and a CPU capability.

7. The system of claim 1, further comprising a directory server that is configured to employ a location indicator associated with each master authentication server, wherein the location indicator enables each user to locate the master authentication server that manages the data for that user.

8. The system of claim 1, wherein the data store further comprises at least one of a database, flat file, and a directory structure.

9. The system of claim 1, wherein manage the data further comprises authenticate each user in part with the data, using a Kerberos model.

10. A method for load balancing over a network, comprising:
 determining a load associated with a master authentication server;
 determining if the load exceeds a pre-determined criteria, and if the load does exceed the pre-determined criteria, partitioning a data store into a plurality of partitions in relation to the load, wherein data about each user is stored in the plurality of partitions of the data store;
 allocating each partition to another each of other master authentication servers; and
 enabling each other master authentication server to manage the data for each user on its partition, wherein manage comprises validate the each user on its partition based on the data for the each user on its partition.

11. The method of claim 10, further comprising redirecting each user to the master authentication server that manages the data about that user on its partition.

12. The method of claim 10, wherein the pre-determined criteria further comprises at least one of a packet rate, CPU utilization, disk subsystem utilization, amount of memory used, number of thread context switches per second, number of memory page-faults per second, CPU capacity, number of connections, a round trip time of a packet, packet loss, number of hops for a packet, network traffic, capacity of the data store, content requested, and a number of authentication requests.

13. The method of claim 10, further comprising employing a location indicator that enables each user to locate the master authentication server that manages the data about that user on its partition.

14. The method of claim 13, wherein the location indicator further comprises at least one of an IP address, a Universal Resource Locator (URL), and a Media Access Control (MAC) address.

15. The method of claim 10, wherein the data about each user is stored in at least one of a database, flat file, and a directory structure.

16. The method of claim 10, wherein partitioning data about each user further comprises employing a partitioning criteria that is based on at least one of a client location, user name, frequency of requests by each user, characteristic of the data store, and a CPU capability.

17. The method of claim 10, wherein enabling each other master authentication server to manage the data further comprises employing the data to authenticate each user on its partition using a salted password.

18. An apparatus for load balancing over a network, comprising:
- a data store that is configured to store data about each user; and
- a master authentication server that is configured to manage data about each user, and if a load on the master authentication server exceeds a pre-determined value, performing actions, including:
- partitioning a data store into a plurality of partitions in relation to the load, wherein the data about each user is stored in the plurality of partitions of the data store;
- allocating each partition to another each of other master authentication servers; and
- enabling each other master authentication server to authenticate each user based on the data for each user on its partition.

19. The apparatus of claim 18, wherein the master authentication server is configured to perform further actions, including redirecting each user to the master authentication server that manages the data about that user on its partition.

20. The apparatus of claim 19, wherein redirecting each user to the master authentication server further comprises employing a location indicator that includes at least one of an Internet Protocol (IP) address, a Universal Resource Locator (URL), and a Media Access Control (MAC) address.

21. The apparatus of claim 18, wherein the pre-determined criteria further comprises at least one of a packet rate, CPU utilization, disk subsystem utilization, amount of memory used, number of thread context switches per second, number of memory page-faults per second, CPU capacity, number of connections, a round trip time of a packet, packet loss, number of hops for a packet, network traffic, capacity of the data store, content requested, and a number of authentication requests.

22. The apparatus of claim 18, wherein partitioning the data about each user further comprises employing a partitioning criteria that is based on at least one of a client location, user name, frequency of requests by each user, characteristic of a data store, and a CPU capability.

23. A system for load balancing over a network, comprising:
- a means for storing data about each user;
- a means for determining if a load on a master authentication server exceeds a pre-determined value, and if the load on the master authentication server does exceed the pre-determined value,
- a means for partitioning a data store into a plurality of partitions in relation to the load, wherein the data about each user is stored in the plurality of partitions of the data store;
- a means for allocating each partition to another each of other master authentication servers; and
- a means for enabling each other master authentication server to manage the data for each user on its partition of the same data store, wherein the data for each user on its partition is stored in the same data store.

* * * * *

UNITED STATES PATENT AND TRADEMARK OFFICE
CERTIFICATE OF CORRECTION

PATENT NO.         : 7,290,040 B2
APPLICATION NO. : 10/318351
DATED              : October 30, 2007
INVENTOR(S)        : Newcombe et al.

It is certified that error appears in the above-identified patent and that said Letters Patent is hereby corrected as shown below:

Column 2, line 35, delete "EMBODIMENT" and insert -- EMBODIMENTS --, therefor.

Column 3, line 21, delete "Rijndael" and insert -- Rjindael --, therefor.

Column 7, line 17, after "like" insert -- . --.

Column 7, line 52, delete "DataStore" and insert -- Data Store --, therefor.

Column 7, line 56, delete "ASS" and insert -- AASs --, therefor.

Column 8, line 66, after "value" insert -- , --.

Column 10, line 61, delete "requesters" and insert -- requestors --, therefor.

Signed and Sealed this

Twenty-fifth Day of March, 2008

JON W. DUDAS
*Director of the United States Patent and Trademark Office*